United States Patent
Yoshikane et al.

(10) Patent No.: US 7,887,943 B2
(45) Date of Patent: Feb. 15, 2011

(54) POWER DEVICE COUPLING A PLURALITY OF CELLS

(75) Inventors: Taketoshi Yoshikane, Kasai (JP); Shingo Ochi, Takasago (JP)

(73) Assignee: Sanyo Electric Co., Ltd., Osaka (JP)

( * ) Notice: Subject to any disclaimer, the term of this patent is extended or adjusted under 35 U.S.C. 154(b) by 1251 days.

(21) Appl. No.: 11/274,250

(22) Filed: Nov. 16, 2005

(65) Prior Publication Data

US 2006/0105624 A1    May 18, 2006

(30) Foreign Application Priority Data

Nov. 18, 2004   (JP) .............................. 2004-335131

(51) Int. Cl.
*H01M 10/38*   (2006.01)
*H01M 2/18*   (2006.01)
*H01M 2/00*   (2006.01)

(52) U.S. Cl. ...................... 429/123; 429/133; 429/163

(58) Field of Classification Search ....................... None
See application file for complete search history.

(56) References Cited

U.S. PATENT DOCUMENTS 3,123,120 A * 3/1964 Grimm et al. ............... 411/111
4,049,883 A * 9/1977 Schenk et al. ............... 429/94

FOREIGN PATENT DOCUMENTS

JP    8-287898    11/1996

OTHER PUBLICATIONS

Machine translation of JP 08-287898, Kawamura Hiroshi, Nov. 1, 1996.*

* cited by examiner

*Primary Examiner*—Dah-Wei D Yuan
*Assistant Examiner*—Kwang Han
(74) *Attorney, Agent, or Firm*—Wenderoth, Lind & Ponack, L.L.P.

(57) ABSTRACT

A power device includes a battery module for fixing a connecting terminal to an end and a bus bar connected to the connecting terminal of the battery module. The connecting terminal includes a fixing plate portion fixed to the end of the cell, an outer cylindrical portion protruded cylindrically from the fixing plate portion, an end face plate portion closing a tip surface of the outer cylindrical portion, and an inner cylindrical portion protruded from the end face plate portion toward the fixing plate portion. The connecting terminal is provided with a female screw on an internal surface of the inner cylindrical portion and a setscrew penetrating through the bus bar is screwed toward the female screw, and the bus bar is fixed to the connecting terminal through the setscrew.

8 Claims, 14 Drawing Sheets

POWER DEVICE COUPLING A PLURALITY OF CELLS

BACKGROUND OF THE INVENTION

1. Field of the Invention

The present invention relates to a power device to be mainly mounted on an electrically-powered vehicle such as a hybrid car, a fuel cell car or an electric car.

2. Description of the Related Art

A power device in which a plurality of cells to be secondary cells is coupled rectilinearly to form a battery module and a plurality of battery modules is further connected is used to meet a demand for a large output as in an electrically-powered vehicle. In the power device of this type, a case 70 accommodates a battery module 71 as shown in FIG. 1. The battery module 71 to be accommodated in the case 70 has both ends to which a connecting terminal 72 formed by a screw and a nut is fixed. The battery module 71 fixes a bus bar 73 to the connecting terminal 72 and is connected in series through the bus bar 73. The case 70 has a side portion provided with an end plate 74 including the bus bar 73. The end plate 74 is a plastic molded product and inserts and fixes the bus bar 73 in an insulating state. In the power device having this structure, a setscrew 75 and a nut 76 are screwed into the bus bar 73 of the end plate 74, and connecting the bus bar 73 to the connecting terminal 72 of the battery module 71.

A drawback of the connecting terminal of the above structure is an electric resistance in a connected portion. For the power device in which a large number of battery modules are connected in series and charge/discharge is carried out with a large current, it is important that the electric resistance of the connecting terminal is as low as possible. A high electric resistance considerably increases a loss in power consumed as Joule heat. The electric resistance of the connecting terminal is raised because the nut, the screw and the like are welded to a metal plate. The metal plate, the nut and the like are connected by spot welding. The spot welding has a small contact area. Consequently, the electric resistance of the connected portion is increased.

There has been developed a connecting terminal fabricated by bending and processing a metal plate without welding a nut and a screw (see Japanese Laid-Open Patent Publication No. 1996-287898).

SUMMARY OF THE INVENTION

A connecting terminal described in the above publication is shown in an exploded perspective view of FIG. 2. A connecting terminal 82 is obtained by cutting a metal plate to have such a structure that four bent pieces 82B are coupled to all sides of a square end face plate portion 82A. The bent piece 82B is bent perpendicularly to the end face plate portion 82A, and furthermore, a lower end is bent in parallel with an end face 81A of a cell 81 and is welded and fixed to the end face 81A.

The connecting terminal 82 having this structure can be produced inexpensively in a large amount by cutting, bending and processing a metal plate. However, there is a drawback that a coupling strength for coupling a bus bar 83 to a cell 81 is reduced. More specifically, the connecting terminal 82 couples the bus bar 83 by screwing a setscrew 85 into a female screw 84 provided on a through hole 82C of the metal plate and the female screw 84 provided on the through hole 82C can be threaded only within a range of a thickness of the metal plate and cannot have a sufficient length for fastening the setscrew 85 with a great torque. For this reason, the setscrew 85 is neither fastened nor fixed to the connecting terminal 82 firmly and strongly, as a result a coupling strength of the bus bar 83 to the connecting terminal 82 is reduced. Moreover, the connecting terminal for coupling the bent pieces around the square end face plate portion to the end face of the cell cannot have a strength which is equivalent to the strength of a nut forming one block as a whole as shown in FIG. 1. For this reason, the coupling strength of the bus bar and the cell is reduced. Furthermore, the setscrew cannot be fastened with a sufficiently great torque. Consequently, there is also a drawback that an electrical contact state of the bus bar and the connecting terminal cannot be brought into an ideal state. The power device in which a large number of battery modules are connected in series through the bus bar is charged/discharged with a very large current. For this reason, it is necessary to cause an electric resistance of the bus bar and the connecting terminal to be as low as possible. A loss caused by the electric resistance of the bus bar and the connecting terminal is increased in proportion to a product of the electric resistance and a square of a current. In order to reduce the electric resistance between the bus bar and the connecting terminal and to stably connect them in a low resistance state, it is necessary to screw the setscrew into the connecting terminal with a sufficient clamping torque to strongly press the bus bar against the connecting terminal in a large area, and furthermore, to increase a contact area between the setscrew and the female screw to press them strongly each other.

It is an object of the present invention to provide a power device which has a structure capable of mass-producing a connecting terminal inexpensively and can couple a bus bar to the connecting terminal firmly in a tough structure, and furthermore, can reduce an electric resistance between the bus bar and the connecting terminal to bring a low loss state in the charge/discharge of a large current and can stably connect the bus bar to the connecting terminal in a low resistance state.

The present invention provides a power device comprising a battery module 20 for coupling a plurality of cells 21 rectilinearly and fixing a connecting terminal 30 to an end, and a bus bar 40 connected to the connecting terminal 30 of the battery module 20 and serving to electrically connect the battery module 20. The connecting terminal 30 includes a fixing plate portion 31 welded and fixed to the end of the cell 21, an outer cylindrical portion 32 protruded cylindrically in an axial direction of the cell 21 from the fixing plate portion 31, an end face plate portion 33 closing a tip surface of the outer cylindrical portion 32, and an inner cylindrical portion 34 provided in a central part of the end face plate portion 33, positioned on an inside of the outer cylindrical portion 32 and protruded from the end face plate portion 33 toward the fixing plate portion 31. The connecting terminal 30 is provided with a female screw 34A on an internal surface of the inner cylindrical portion 34 and a setscrew 45 penetrating through the bus bar 40 is screwed toward the female screw 34A, and the bus bar 40 is fixed to the connecting terminal 30 through the setscrew 45.

Moreover, the present invention provides a power device comprising a battery module 20 for coupling a plurality of cells 21 rectilinearly and fixing a connecting terminal 30 to an end, and a bus bar 40 connected to the connecting terminal 30 of the battery module 20 and serving to electrically connect the battery module 20. The connecting terminal 30 includes a fixing plate portion 31 welded and fixed to the end of the cell 21, an outer cylindrical portion 32 protruded cylindrically in an axial direction of the cell 21 from the fixing plate portion 31, an end face plate portion 33 for closing a tip surface of the outer cylindrical portion 32 and opening a through hole 33A on a center, and a nut 47 positioned on an inside of the outer cylindrical portion 32 and provided on an internal surface side of the end face plate portion 33 in a non-rotation state. The connecting terminal 30 screws a setscrew 45 penetrating through the bus bar 40 and the end face plate portion 33 into the nut 47, and fixing the bus bar 40 to the connecting terminal 30 through the setscrew 45.

Furthermore, the present invention provides a power device comprising a battery module 20 for coupling a plurality of cells 21 rectilinearly and fixing a connecting terminal 30 to an end 31, and a bus bar 40 connected to the connecting terminal 30 of the battery module 20 and serving to electrically connect the battery module 20. The connecting terminal 30 includes a fixing plate portion 31 welded and fixed to the end of the cell 21 and a cylindrical screw cylinder portion 35 protruded in an axial direction of the cell 21 from the fixing plate portion 31. The connecting terminal 30 is provided with a male screw 35A on an outside surface of the screw cylinder portion 35, causes the screw cylinder portion 35 to penetrate a through hole 41 of the bus bar 40 and screws the nut 46 into a tip portion protruded from the bus bar 40, and fixing the bus bar 40 to the connecting terminal 30 through the nut 46.

The power device described above has a feature that the connecting terminal can have such a structure as to be mass-produced inexpensively, and furthermore, the bus bar and the connecting terminal can be coupled in a firm and strong structure. In the power device according to the present invention, the fixing plate portion in which the connecting terminal for connecting the bus bar to the cell is welded and fixed to the end of the cell provided with the outer cylindrical portion, the end face plate portion and the inner cylindrical portion, the female screw is provided on the internal surface of the inner cylindrical portion and the setscrew is screwed into the same portion to couple the bus bar, the fixing plate portion in which the connecting terminal is welded and fixed to the end of the cell is provided with the outer cylindrical portion and the end face plate portion and the setscrew is screwed into the nut provided on the inside of the end face plate portion to couple the bus bar, or the fixing plate portion in which the connecting terminal is welded and fixed to the end of the cell is provided with the screw cylinder portion and the male screw is provided on the outside surface of the screw cylinder portion, and the screw cylinder portion is inserted in the through hole of the bus bar and the nut is screwed into the tip portion to fix the bus bar to the connecting terminal. By these structures, a large number of threads are provided on the female screw disposed in the inner cylindrical portion or the female screw of the nut disposed on the inside of the end face plate portion so that the setscrew can be fastened with significant torque, and furthermore, a large number of threads are provided on the male screw disposed in the screw cylinder portion so that the nut can be fastened with significant torque. The connecting terminal having the above structure can screw the setscrew into the inner cylindrical portion or the female screw of the nut with significant torque or the nut can be screwed into the screw cylinder portion with significant torque so that the bus bar can be firmly fixed to the connecting terminal. Consequently, it is possible to fasten the setscrew and the nut with significant torque and to strongly press the bus bar against the connecting terminal in a large area, and coupling them firmly.

In the power device in which the fixing plate portion is provided with the outer cylindrical portion, the end face plate portion and the inner cylindrical portion, and the female screw is provided on the internal surface of the inner cylindrical portion and the setscrew to penetrate through the bus bar is screwed into the female screw, and coupling the bus bar to the connecting terminal, moreover, the end face plate portion for coupling the bus bar through the setscrew and the inner cylindrical portion is coupled to the fixing plate portion through the outer cylindrical portion. The outer cylindrical portion takes a cylindrical shape and couples the whole periphery of the end face plate portion to the fixing plate portion. Consequently, the end face plate portion is coupled to the fixing plate portion in a firm and strong structure. Accordingly, the bus bar is firmly coupled to the end face plate portion through the setscrew, and furthermore, the end face plate portion is firmly coupled to the fixing plate portion through the outer cylindrical portion. Consequently, the bus bar is coupled to the end face of the cell through the connecting terminal in a strong structure.

In the power device in which the fixing plate portion is provided with the outer cylindrical portion and the end face plate portion, the nut is disposed on the inside of the end face plate portion and the setscrew to penetrate through the bus bar and the fixing plate portion is screwed into the nut to couple the bus bar to the connecting terminal, furthermore, the end face plate portion for coupling the bus bar through the setscrew and the nut is coupled to the fixing plate portion at the outer cylindrical portion. Consequently, the setscrew can be fastened to the nut with significant torque, and coupling the bus bar to the connecting terminal firmly. Furthermore, the outer cylindrical portion takes a cylindrical shape and couples the whole periphery of the end face plate portion to the fixing plate portion. Consequently, the end face plate portion is coupled to the fixing plate portion in a firm and strong structure. Accordingly, the bus bar is firmly coupled to the end face plate portion through the setscrew and the nut, and furthermore, the end face plate portion is firmly coupled to the fixing plate portion through the outer cylindrical portion and the bus bar is thus coupled to the end face of the cell through the connecting terminal in a strong structure.

In the power device in which the screw cylinder portion provided with the male screw is coupled to the fixing plate portion and the screw cylinder portion is caused to penetrate through the bus bar, and the nut is screwed into the male screw, and coupling the bus bar to the connecting terminal, moreover, the screw cylinder portion to be the male screw is coupled to the fixing plate portion. With this structure, the screw cylinder portion can be coupled to the fixing plate portion in a firm and strong structure. Accordingly, the bus bar can be firmly coupled to the connecting terminal through the nut, and furthermore, the screw cylinder portion can be firmly coupled to the fixing plate portion. Consequently, the bus bar can be coupled to the end face of the cell through the connecting terminal in a strong structure.

In the power device described above, furthermore, it is possible to reduce an electric resistance between the bus bar and the connecting terminal. The setscrew and the nut are fastened with significant torque to couple the bus bar to the connecting terminal. The bus bar to be fastened with significant torque and coupled to the connecting terminal can be pressed and connected at a high pressure in a large area. Consequently, it is possible to reduce an electric resistance in a contact portion and carry out charge/discharge with a large current, thus reducing a loss caused by the electric resistance in the connected portion. Furthermore, the bus bar to be fastened and coupled with significant torque can also be connected to the connecting terminal stably in a low resistance state for a long period of time.

The fixing plate portion 31 of the connecting terminal 30 can be welded and fixed to the electrode end face of the cell 21 or the outer peripheral surface of the cell end. Furthermore, the fixing plate portion 31 of the connecting terminal 30 has a concave portion 37 on an opposite surface to a contact surface with the cell 21 and a welded portion to the cell 21 can be thinned through the concave portion 37. The fixing plate portion 31 of the connecting terminal 30 has a convex portion 36 protruded toward the cell 21 in the connected portion to the cell 21 and the concave portion 37 is provided on an opposite surface to the convex portion 36, and the welded portion to the cell 21 can be thinned through the concave portion 37 and the convex portion 36.

The outer cylindrical portion 32 of the connecting terminal 30 takes a whole cylindrical shape and can be provided with the plane 32A on a part of an outer periphery which is opposed. In the connecting terminal 30, the outer cylindrical portion 32 takes a whole cylindrical shape and the inner cylindrical portion 34 can be provided concentrically with the outer cylindrical portion 32 taking a cylindrical shape.

In the connecting terminal 30, the protrusion height of the inner cylindrical portion 34 is greater than a half of the protrusion height of the outer cylindrical portion 32 and a tip can have such a height that a clearance is formed together with the end face of the cell 21. The nut 47 can be a press nut.

In the power device according to the present invention, the battery modules 20 are arranged in parallel and are accommodated in the case 10, and furthermore, the case 10 can have the holding portion 13 for holding the battery module 20 in contact with the surface of the battery module 20, and can have the peripheral wall 16 for inserting the outer cylindrical portion 32 of the connecting terminal 30 fixed to the battery module 20. In the power device, the battery module 20 is held by the holding portion 13 of the case 10 and the bus bar 40 is fixed to the connecting terminal 30 with the setscrew 45 in a state in which the outer cylindrical portion 32 of the connecting terminal 30 fixed to the battery module 20 is inserted through the peripheral wall 16, and the peripheral wall 16 can be disposed between the bus bar 40 and the end face of the battery module.

The above and further objects and features of the invention will more fully be apparent from the following detailed description with accompanying drawings.

DETAILED DESCRIPTION OF THE PREFERRED EMBODIMENTS

Figure 1:
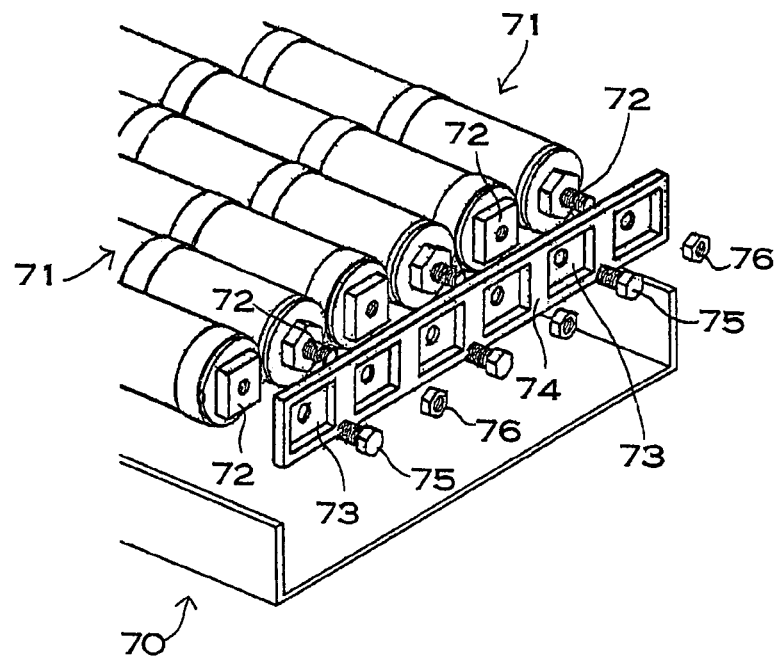
FIG. 1 is an exploded perspective view showing an example of a conventional power device.
Figure 2:
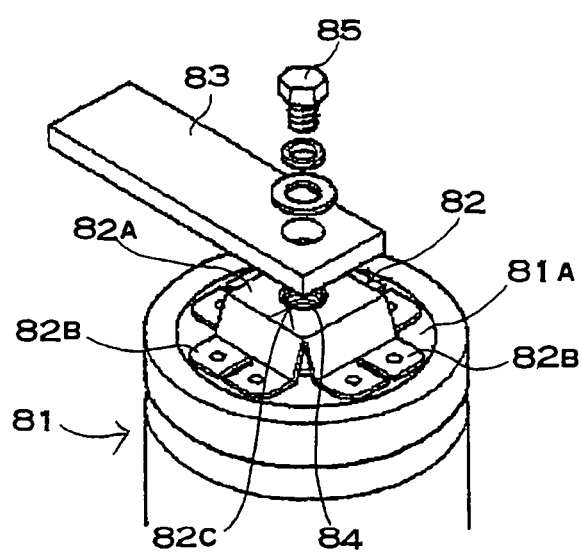
FIG. 2 is an exploded perspective view showing another example of a conventional connecting terminal.
Figure 3:
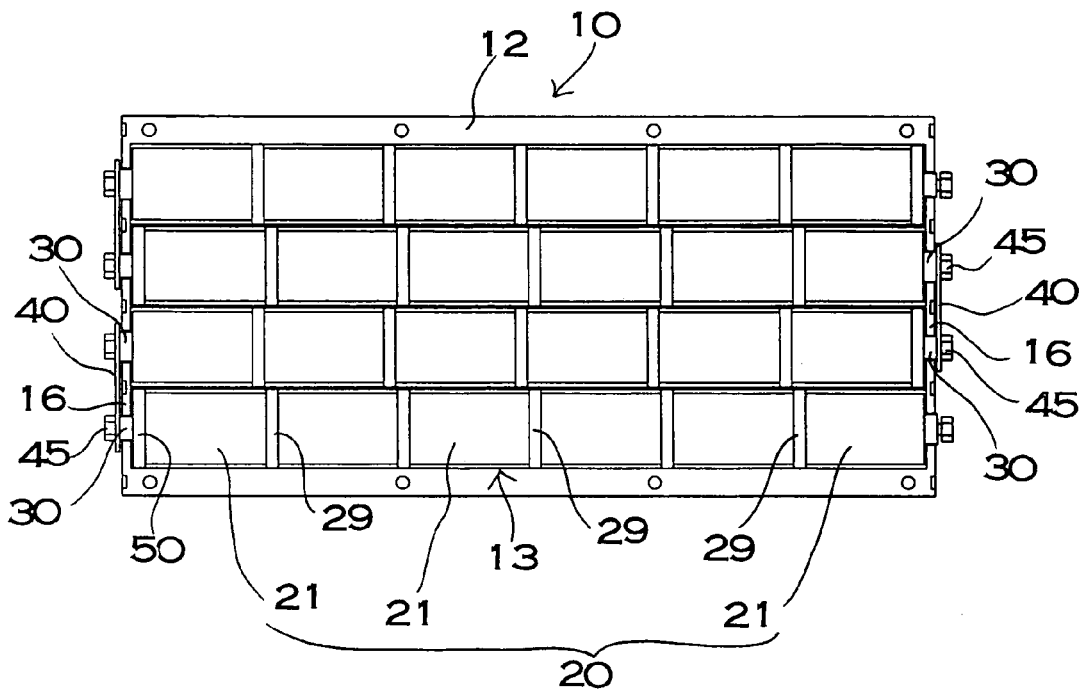
FIG. 3 is a plan view showing an internal structure of a power device according to an example of the present invention.
Figure 4:
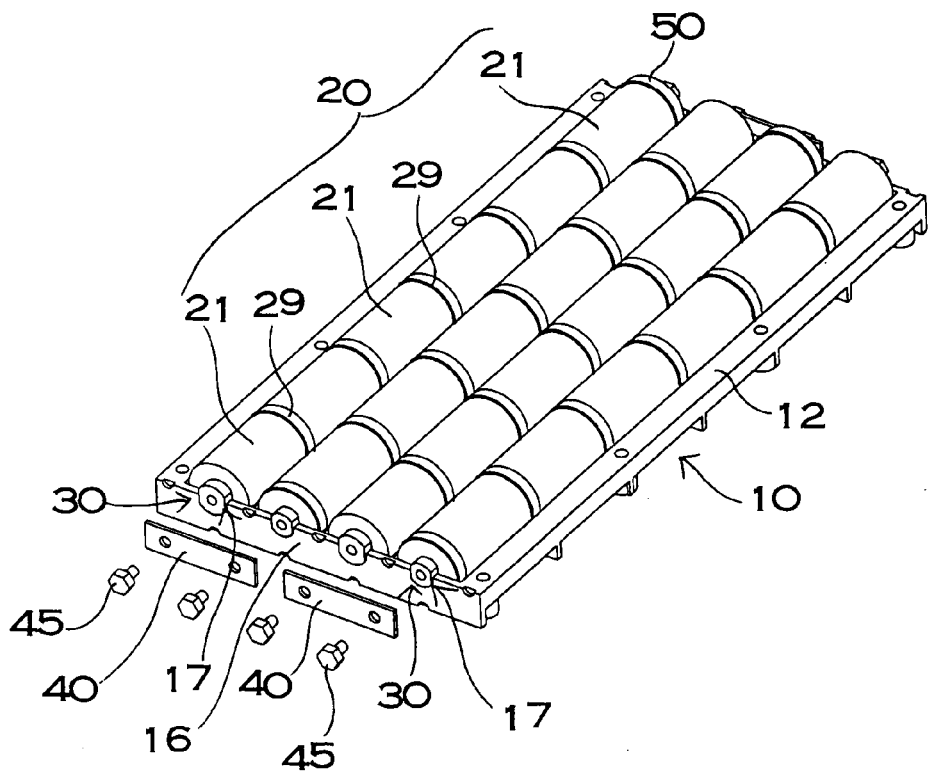
FIG. 4 is a perspective view showing a bus bar and a setscrew in the power device illustrated in FIG. 3 which are exploded.
Figure 5:
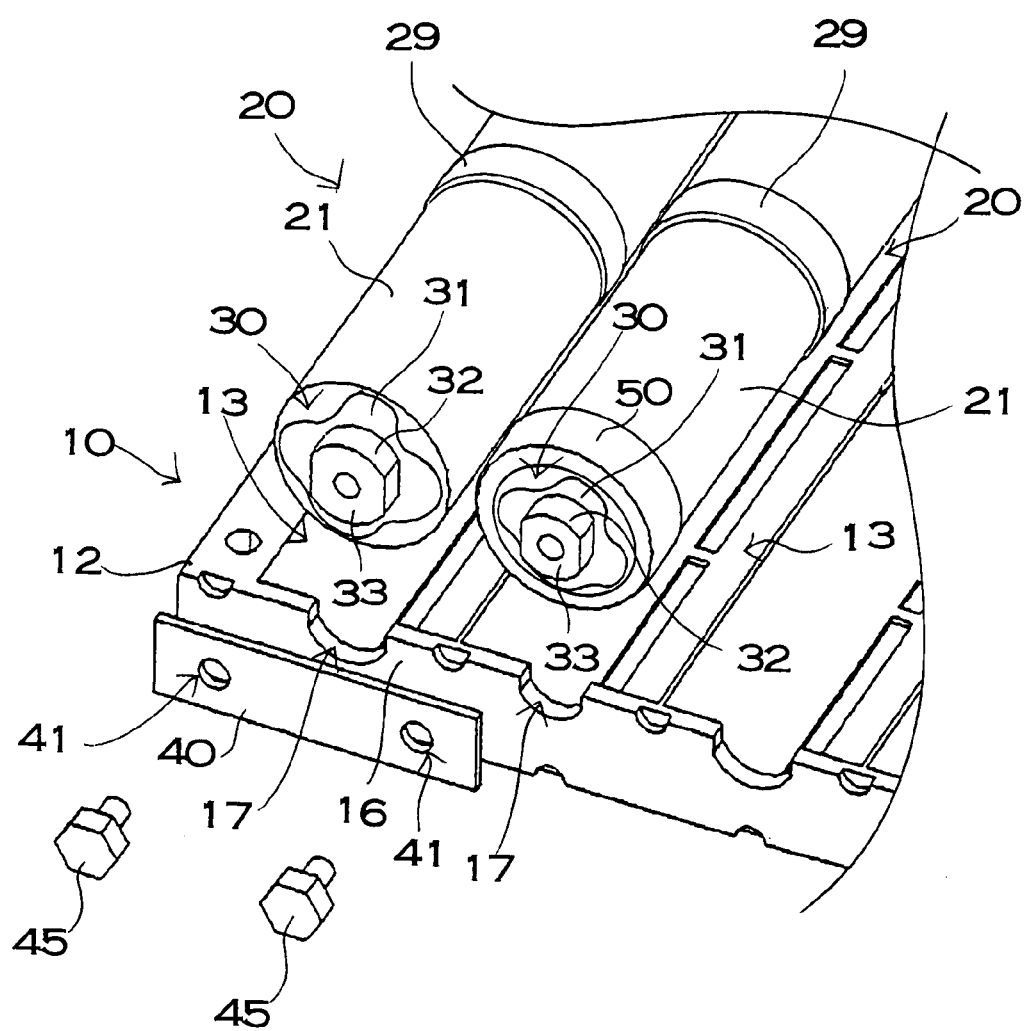
FIG. 5 is an enlarged and exploded perspective view showing the power device illustrated in FIG. 4.
Figure 6:
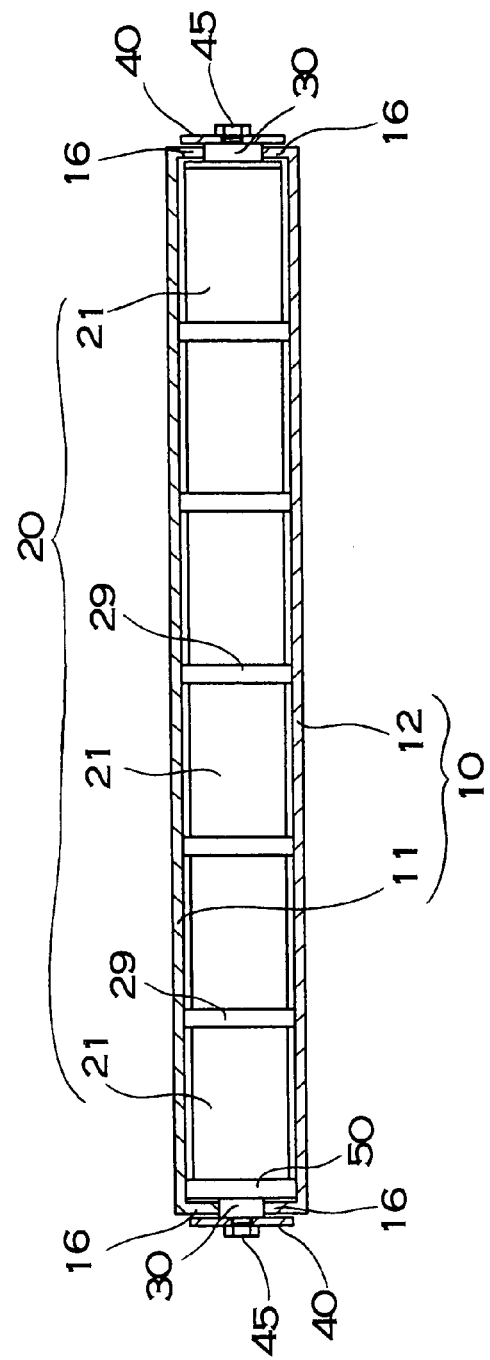
FIG. 6 is a longitudinal sectional view showing the power device according to the example of the present invention.

In a power device shown in FIGS. 3 to 6, a plurality of battery modules 20 in which a plurality of cells 21 is coupled rectilinearly is accommodated in a case 10 and the adjacent battery modules 20 are connected in series through a bus bar 40. The case 10 includes an upper case 11 and a lower case 12. FIG. 3 is a plan view excluding the upper case, FIG. 4 is an exploded perspective view showing the bus bar 40 and a setscrew 45, FIG. 5 is an exploded perspective view in which the battery module 20 is attached to the case 10, and FIG. 6 is a longitudinal sectional view. A power device shown in these drawings is mainly used for an electrically-powered vehicle such as a hybrid car, an electric car or a fuel cell car. The power device according to the present invention can also be used to meet a demand for a large output in addition to the electrically-powered vehicle. In the battery module 20 in the drawings, the secondary cells 21 to be cylindrical cells are coupled rectilinearly and are thus connected in series. A rectangular cell can also be used for the battery module.

For the secondary cell 21, it is possible to use all cells which can be charged, for example, a nickel—hydrogen cell, a lithium ion secondary cell and a nickel-cadmium cell. The nickel—hydrogen cell and the lithium ion secondary cell are suitable for the secondary cell used in a set cell for the electrically-powered vehicle. The reason is that they have a large output for a volume and a weight and have an excellent large current characteristic.

Figure 7:
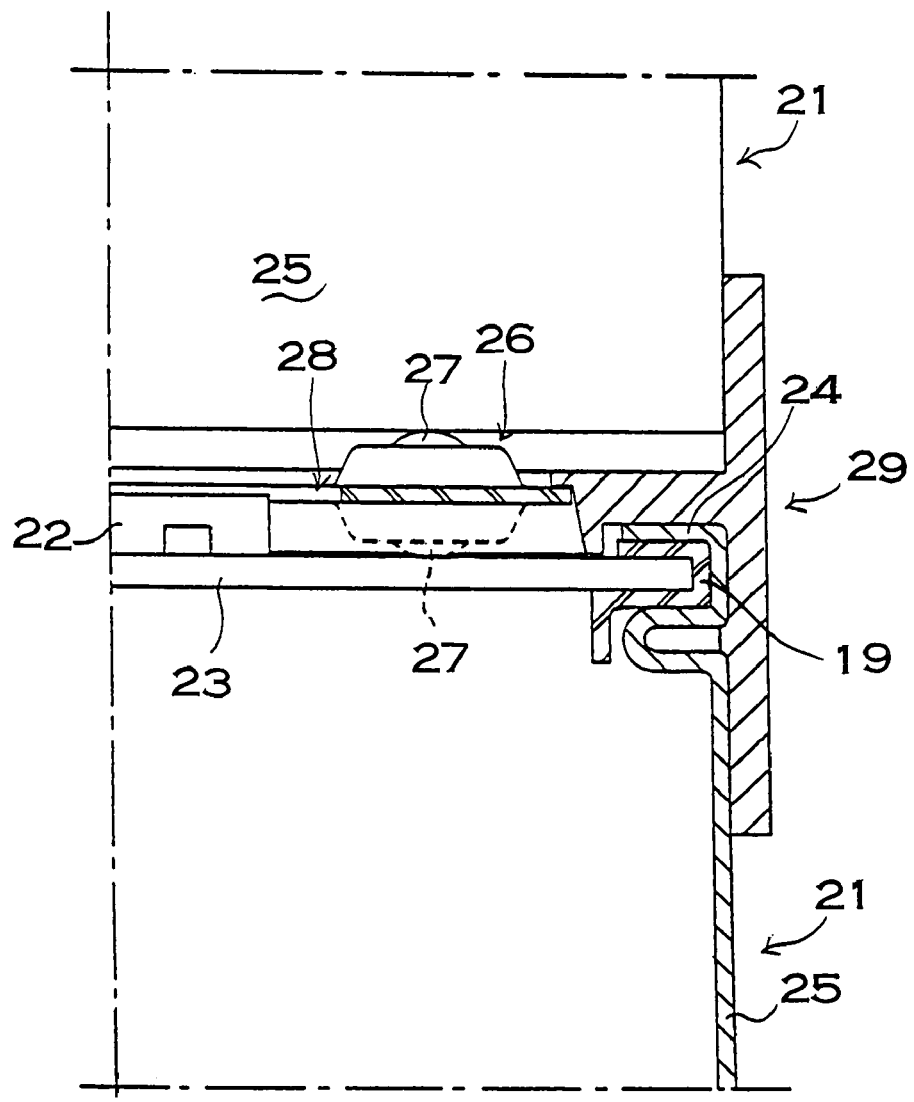
FIG. 7 is an enlarged sectional view showing a coupling structure of a cell of a battery module.

As shown in a sectional view of FIG. 7, the secondary cell 21 seals an opening portion of an outer can 25 in airtightness by means of a sealing plate 23. The outer can 25 and the sealing plate 23 are metal plates. The outer can 25 is fabricated by press molding the metal plate to be a bottomed cylinder. The sealing plate 23 is welded a convex electrode 22 to a center. An electrode (not shown) is provided in the outer can 25. Furthermore, an electrolyte is also filled. In the outer can 25, an end of the opening portion is caulked to fix the sealing plate 23 in airtightness. The sealing plate 23 is interposed by the caulking portion of the outer can 25 and is fixed in airtightness through a gasket 19. The gasket 19 is a rubber-shaped elastic member made of an insulating material and serves to insulate the sealing plate 23 from the outer can 25, and furthermore, to close, airtight, a clearance between the sealing plate 23 and the outer can 25. A caulking convex portion 24 is provided in the peripheral edge part of the sealing plate 23. In the secondary cell 21, the sealing plate 23 is set to be a first electrode and the outer can 25 is set to be a second electrode. In a nickel-hydrogen hydrogen cell, the first electrode is set to be a positive electrode and the second electrode is set to be a negative electrode. It is also possible to set the first and second electrodes to be the negative and positive electrodes, respectively.

Figure 8:
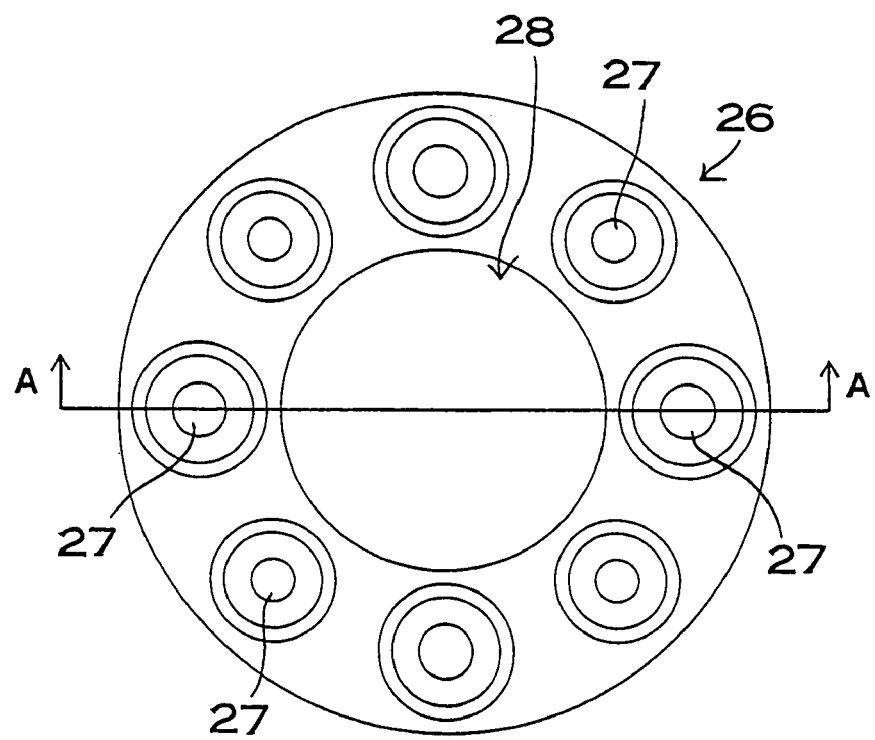
FIG. 8 is a plan view showing a connecting member of the battery module illustrated in FIG. 7.
Figure 9:
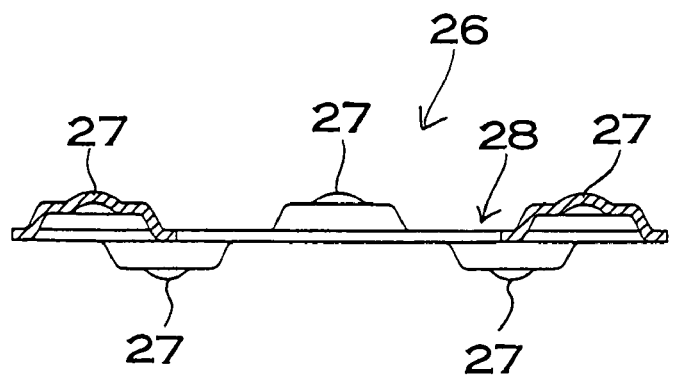
FIG. 9 is a sectional view taken along an A-A line of the connecting member illustrated in FIG. 8.

In the battery module 20, a connecting member 26 is provided between the secondary batteries 21 and they are connected in series through the connecting member 26 as shown in FIG. 7. In the battery module 20 shown in the drawing, the sealing plate 23 of one of the secondary cells 21 and the outer can 25 of the other secondary cell 21 are connected to each other through the connecting member 26. The connecting member 26 is fabricated by press molding a metal plate, and is welded and connected to the end faces of the secondary cells 21 opposed to each other and electrically connects the secondary cells 21 in series. FIGS. 8 and 9 show the connecting member 26, and FIG. 8 is a plan view and FIG. 9 is a sectional view. The connecting member 26 is provided with a plurality of welding convex portions 27 which is formed by molding a metal plate to take a shape of a ring having a hole and is protruded from both surfaces, and is thus welded to the end face of the cell. The welding convex portion 27 protruded from both surfaces is welded to the end faces of the cell which are opposed to each other and serves to serially connect the secondary cells 21 disposed adjacently to each other. The connecting member 26 in the drawing is provided with a center hole 28 and the convex electrode 22 is provided in the center hole 28. The connecting member 26 is held in a constant position through a holding cap 29. The holding cap 29 is wholly molded by an insulating material such as plastic. The holding cap 29 is disposed between the secondary cells 10 which are adjacent to each other and holds the connecting member 20 in a constant position so as to slip off with difficulty.

The battery module 20 has both ends to which a connecting terminal 30 for coupling the bus bar 40 is fixed. The connecting terminal 30 for the adjacent battery modules 20 is coupled to the bus bar 40 formed by the metal plate. The bus bar 40 connects the battery modules 20 in series. The battery module 20 is coupled to the bus bar 40 in a state in which it is accommodated in the case 10. The case 10 has a peripheral wall 16 for inserting a part of the connecting terminal 30 and the bus bar 40 is connected to the connecting terminal 30 at an outside of the peripheral wall 16.

FIGS. 10 to 24 show the connecting terminal 30 to be connected to both ends of the battery module 20. FIGS. 10, 11, 16, 18, 19, 21 and 22 show the connecting terminal 30 to be connected to the first electrode, and FIGS. 12 to 15, 17, 23 and 24 show the connecting terminal 30 to be connected to the second electrode. The connecting terminal 30 to be connected to the first electrode has a different shape as the shape of the connecting terminal 30 to be connected to the second electrode. The connecting terminal 30 having the different shape is fixed to the end faces of the positive and negative cells of the battery module 20. Since the battery module 20 fixes the connecting terminals 30 having different shapes on both positive and negative ends, it can be accommodated in the case 10 in a distinction of the positive and negative electrode from each other.

The connecting terminal 30 shown in FIGS. 10 to 15 includes a fixing plate portion 31 to be welded and fixed to an end of an cell 21, an outer cylindrical portion 32 protruded cylindrically in an axial direction of the cell 21 from the fixing plate portion 31, an end face plate portion 33 closing a tip surface of the outer cylindrical portion 32, and an inner cylindrical portion 34 provided in a central part of the end face plate portion 33, positioned on an inside of the outer cylindrical portion 32 and protruded from the end face plate portion 33 toward the fixing plate portion 31. In the connecting terminal 30, a female screw 34A is provided on an internal surface of the inner cylindrical portion 34. A setscrew 45 penetrating through the bus bar 40 is screwed toward the female screw 34A provided on an inner peripheral surface and the bus bar 40 is fixed to the connecting terminal 30 through the setscrew 45.

The connecting terminal 30 shown in FIGS. 16 to 20 includes a fixing plate portion 31 to be welded and fixed to the end of the cell 21, the outer cylindrical portion 32 protruded cylindrically in the axial direction of the cell 21 from the fixing plate portion 31, an end face plate portion 33 closing the tip surface of the outer cylindrical portion 32, and a nut 47 positioned on an inside of the outer cylindrical portion 32 and provided on the internal surface of the end face plate portion 33 in a non-rotation state. The end face plate portion 33 forms a through hole 33A for inserting the setscrew 45 around there and can cause the setscrew 45 to pass the through hole 33A and to be screwed into the female screw of the nut 47. The connecting terminal 30 screws the setscrew 45 penetrating the bus bar 40 and the end face plate portion 33 into the nut 47 and fixes the bus bar 40 to the connecting terminal 30 through the setscrew 45 and the nut 47.

The connecting terminal 30 shown in FIGS. 21 to 24 includes a fixing plate portion 31 to be welded and fixed to the end of the cell 21 and a cylindrical screw cylinder portion 35 protruded in the axial direction of the cell 21 from the fixing plate portion 31. The screw cylinder portion 35 has a male screw 35A on an outside surface. The screw cylinder portion 35 is caused to penetrate a through hole 41 of the bus bar 40 and the nut 46 is screwed into a tip portion protruded from the bus bar 40, and the bus bar 40 is fixed to the connecting terminal 30 through the nut 46.

Figure 10:
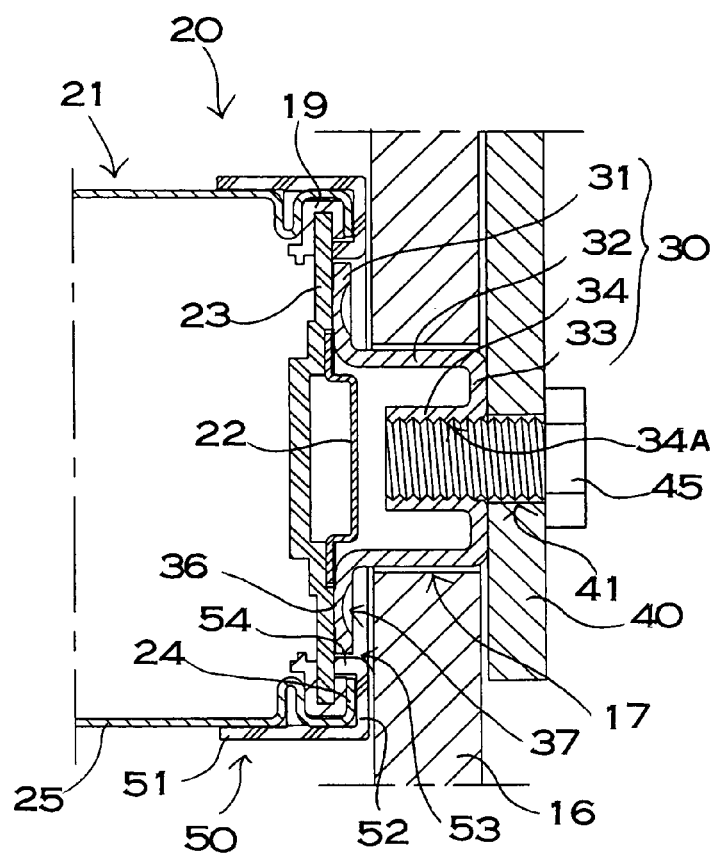
FIG. 10 is a sectional view showing a coupling structure of a first electrode in the battery module.
Figure 11:
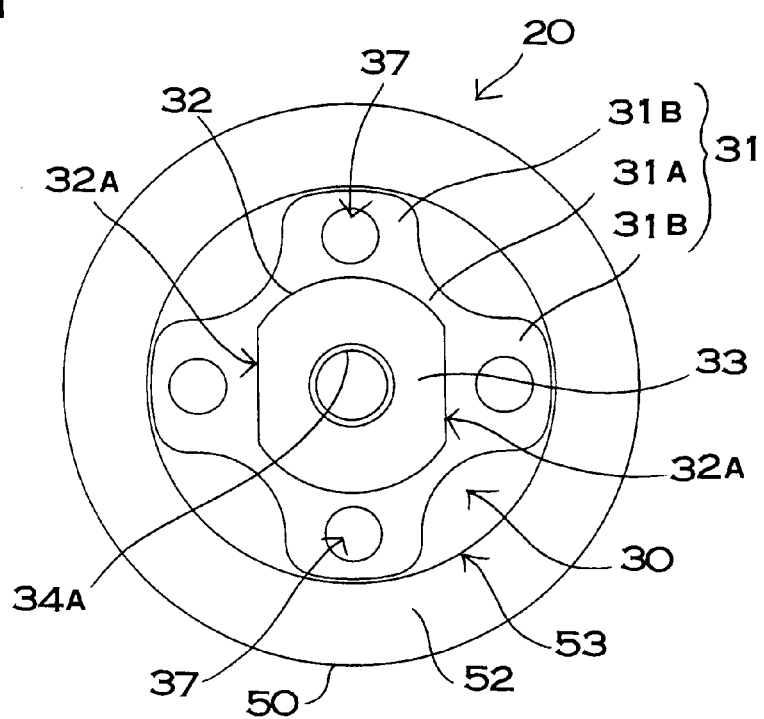
FIG. 11 is a front view showing a state in which a connecting terminal is fixed to the first electrode of the battery module.
Figure 16:
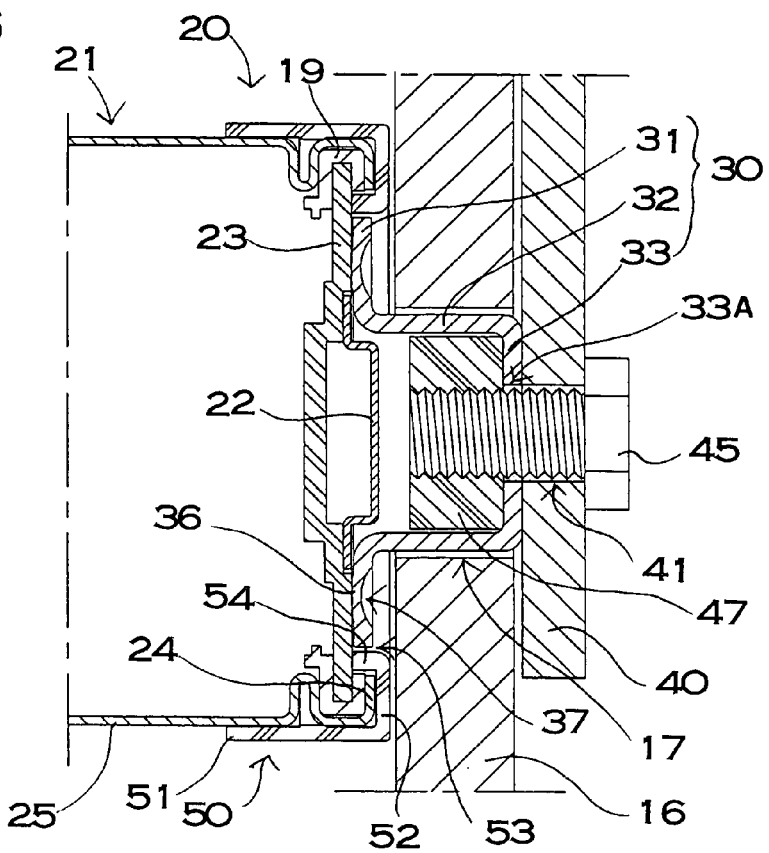
FIG. 16 is a sectional view showing a coupling structure of a first electrode of a battery module in a power device according to another example of the present invention.
Figure 17:
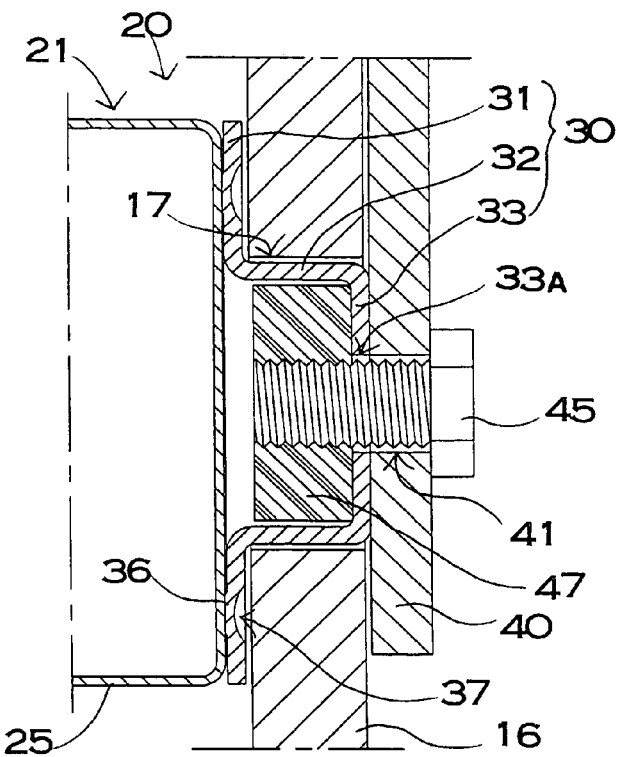
FIG. 17 is a sectional view showing a coupling structure of a second electrode of the battery module in the power device according to the another example of the present invention.
Figure 21:
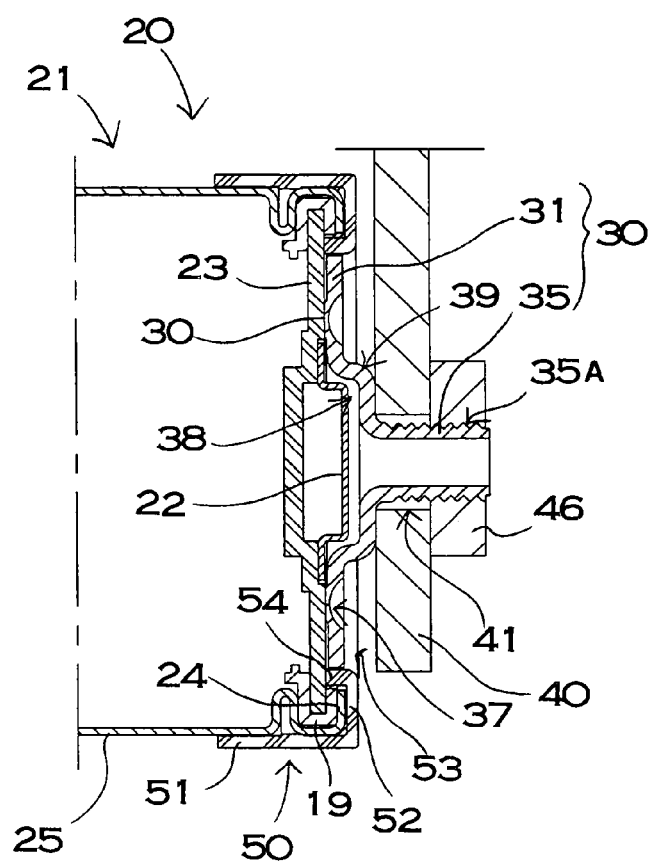
FIG. 21 is a sectional view showing a coupling structure of a first electrode of a battery module in a power device according to a further example of the present invention.
Figure 22:
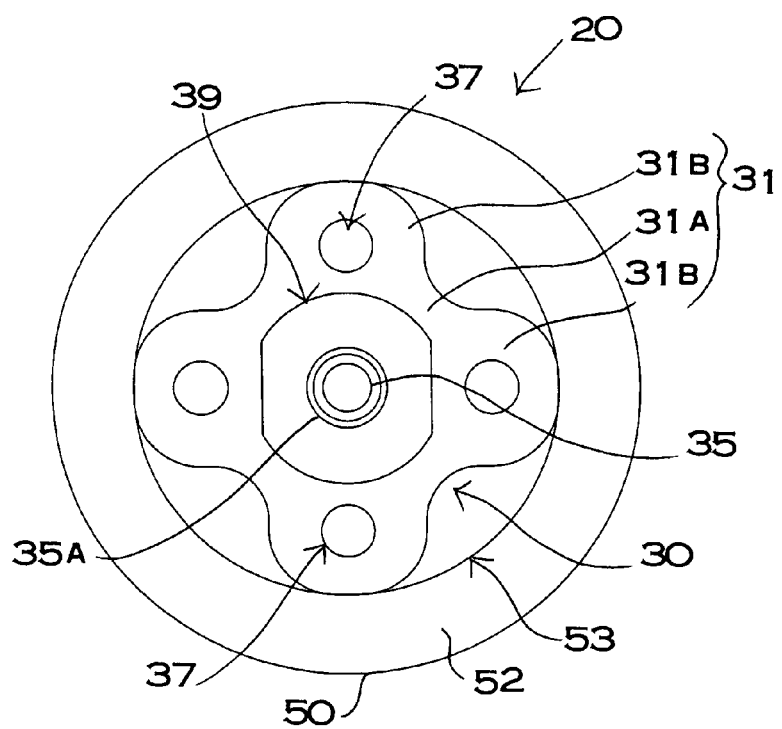
FIG. 22 is a front view showing a state in which a connecting terminal is fixed to the first electrode of the battery module illustrated in FIG. 21.

The fixing plate portion 31 of the connecting terminal 30 shown in the drawings has a variation in an external shape in a fixation to the first electrode and a fixation to the second electrode, and the fixing plate portion 31 to be fixed to the first electrode has a smaller external shape as the external shape of the fixing plate portion 31 to be fixed to the second electrode. Sectional views of FIGS. 10, 16 and 21 show a state in which the fixing plate portion 31 is fixed to the first electrode. The fixing plate portion 31 in these drawings has a smaller external shape than an internal shape of the caulking convex portion 24. The fixing plate portion 31 is welded and fixed to the sealing plate 23 on the inside of the caulking convex portion 24. In the fixing plate portion 31 to be connected to the second electrode, an external shape is set to be almost equal to the external shape of the end face of the battery module, that is, the external shape of the end face of the cell and is thus fixed to a bottom face of the outer can 25 so as not to be protruded from an outer peripheral surface.

The fixing plate portion 31 of the connecting terminal 30 shown in the drawing has a plurality of protruded pieces 31B uniformly provided on an outer periphery of a ring plate 31A in a central part. Although the fixing plate portion 31 shown in the drawing is provided with the protruded piece 31B in four directions, it can also be provided in three directions or five directions or more. Moreover, the fixing plate portion can also take an external shape which is a circle or a polygon without providing the protruded piece. In the fixing plate portion 31 shown in the drawing, each of the protruded pieces 31B is fixed to the sealing plate 23 and the bottom face of the outer can 25 by resistance spot welding. The fixing plate portion can also be laser welded and fixed to the cell. Moreover, the fixing plate portion to be welded and fixed to the second electrode has a cylindrical portion provided on an outer periphery, which is not shown, and the bottom portion of the outer can is inserted into the cylinder portion and can also be welded and fixed to the bottom portion of the outer can.

In the fixing plate portion 31, a convex portion 36 protruded toward the cell 21 is provided in the portion to be welded to the cell 21, and furthermore, a concave portion 37 is provided on an opposite surface to the convex portion 36 and the welded portion to the cell 21 is thinned by the concave portion 37 and the convex portion 36. The connecting terminal 30 having this structure regulates a depth of the concave portion 37 and a protrusion height of the convex portion 36, and the welded portion can be thinned to have an optimum thickness for the welding. For example, it is possible to thin the welded portion by setting the depth of the concave portion 37 to be greater than the protrusion height of the convex portion 36. Consequently, the fixing plate portion 31 is fabricated by a thick metal plate, and furthermore, the welded portion of the fixing plate portion 31 is set to have an optimum thickness for the welding. Thus, it is possible to carry out the welding to the sealing plate 23 and the outer can 25 in the cell 1 reliably and stably so as not to slip off.

For example, in the connecting terminal 30, the fixing plate portion 31 is fabricated by a metal plate having a thickness of 1 mm, and the welded portion to the cell 21 is thinned to have a thickness of 0.5 mm by the concave portion 37 and the convex portion 36 and the fixing plate portion 31 is set to being strong structure. Consequently, it is possible to carry out the welding to the cell 21 firmly and reliably. In particular, the metal plate of the connecting terminal 30 is formed of iron, an iron alloy or the like so that the strength of the connecting terminal 30 can be increased. In the connecting terminal 30 fabricated by the metal plate, the thickness of the fixing plate portion 31 can be 0.6 to 1.5 mm. Moreover, the thickness of the welded portion provided with the concave portion 37 and the convex portion 36 can also be 0.3 to 0.8 mm.

The connecting terminal 30 shown in FIGS. 10 to 15 is provided with the outer cylindrical portion 32, the end face plate portion 33 and the inner cylindrical portion 34 which are coupled to the fixing plate portion 31. The outer cylindrical portion 32 is protruded from an inner periphery of the ring plate 31A of the fixing plate portion 31 in a perpendicular direction. The outer cylindrical portion 32 shown in the drawing takes a whole shape of a cylinder and a plane 32A is provided on a part of an outer periphery which is opposed. When the bus bar 40 is to be coupled with a sufficient strength, the outer cylindrical portion 32 taking this shape can hold the plane 32A to be an opposed surface and can support the outer cylindrical portion 32 so as not to be rotated. The outer cylindrical portion can also take a shape of a polygonal tube in addition to the cylindrical shape.

The connecting terminal 30 to be connected to the first electrode and the connecting terminal 30 to be connected to the second electrode have a variation in an external shape of the outer cylindrical portion 32. The connecting terminal 30 to be connected to the first electrode takes a smaller external shape of the outer cylindrical portion 32 than the connecting terminal 30 to be connected to the second electrode. The outer cylindrical portion 32 shown in the drawing takes a cylindrical shape. For this reason, the outer cylindrical portions 32 to be connected to the first electrode and the second electrode are set to have a variation in an outside diameter of the outer cylindrical portion 32. In the battery module 20 in which the connecting terminal 30 having this structure is fixed to the end, the shape of the connecting terminal 20 is varied on positive and negative electrode sides. Consequently, the battery module 20 can be set to the case 10 without a distinction of the positive and negative electrode sides from each other.

The outside diameter of the outer cylindrical portion 32 specifies the external shape of the end face plate portion 33 and limits the external shape of the inner cylindrical portion 34 to be provided on the end face plate portion 33. In order to cause the end face plate portion 33 to touch the bus bar 40 in a sufficient area and to screw a sufficiently thick setscrew 45 into the inner cylindrical portion 34, a diameter is set to be 10 mm to 23 mm if the external shape of the outer cylindrical portion 32 is a cylinder and a length of a diagonal line is set to be 10 mm to 23 mm if the same external shape is a polygonal cylinder. Furthermore, it is preferable that the outside diameter of the outer cylindrical portion 32 should be set to be 13 mm in the connecting terminal 30 to be fixed to the first electrode and the outside diameter of the outer cylindrical portion 32 should be set to be 16 mm in the connecting terminal 30 to be fixed to the second electrode.

A protrusion of the outer cylindrical portion 32 from the fixing plate portion 31 is set to have such a height that a sufficient number of threads can be provided in the inner cylindrical portion 34 to firmly fix the setscrew 45. In the power device shown in the drawing, moreover, the outer cylindrical portion 32 is inserted through the peripheral wall 16 of the case 10 and the bus bar 40 is fixed to the end face plate portion 33 provided on the tip of the outer cylindrical portion 32. Accordingly, the outer cylindrical portion 32 has such a height that the end face plate portion 33 is positioned on the same level with the outside surface of the peripheral wall 16 or the end face plate portion 33 can be protruded slightly outward from the outside surface of the peripheral wall 16. For this reason, the protrusion height of the outer cylindrical portion 32 is set to be equal to the thickness of the peripheral wall 16 of the case 10 or is set to be greater than the thickness of the peripheral wall 16. From the foregoing, the protrusion height of the outer cylindrical portion 32 is set to be 5 mm to 15 mm, for example.

The connecting terminal 30 to be fixed to the first electrode is fixed to the inside of the caulking convex portion 24. For this reason, the protrusion height of the outer cylindrical portion 32 is set to be greater than the height of the connecting terminal 30 to be fixed to the second electrode. The reason is that the outer cylindrical portion 32 is to be protruded beyond the caulking convex portion 24. For example, the protrusion height of the outer cylindrical portion 32 in the connecting terminal 30 to be fixed to the first electrode is set to be 11 mm and the protrusion height of the outer cylindrical portion 32 in the connecting terminal 30 to be fixed to the second electrode is set to be 9.5 mm.

The end face plate portion 33 is formed to be a parallel plane with the fixing plate portion 31 and couples the bus bar 40 in a plane contact state.

The inner cylindrical portion 34 is protruded from the end face plate portion 33 toward the fixing plate portion 31. The inner cylindrical portion 34 is provided with the female screw 34A on an internal surface. The female screw 34A is provided by pressing a metal plate to provide the inner cylindrical portion 34 and then cutting the internal surface spirally. It is also possible to use a tap screw for a setscrew and to screw the setscrew into the inner cylindrical portion, and providing the female screw through the setscrew. The inner cylindrical portion 34 is coupled to the end face plate portion 33 with a central axis having an orthogonal posture to the surface of the end face plate portion 33. The reason is that the bus bar 40 is to be fixed to the end face plate portion 33 with the setscrew 45 to be screwed into the inner cylindrical portion 34. The inner cylindrical portion 34 is provided with the threaded female screw 34A capable of firmly fixing the setscrew 45. The inner cylindrical portion 34 is provided with the female screw 34A of M5 to M6, for example, and a length of an effective screw portion which is threaded is set to be equal to or greater than 3 mm, and preferably, is equal to or greater than 4 mm. In the connecting terminal 30 to be fabricated by pressing a metal plate, the length of the effective screw portion of the inner cylindrical portion 34 is set to be equal to or greater than three times, and to be preferably equal to or greater than four times as great as the thickness of the metal plate to be pressed. For example, the connecting terminal 30 is fabricated by pressing a metal plate having a thickness of 1 mm and the length of the effective screw portion of the inner cylindrical portion 34 is set to be equal to or greater than 3 mm or 4 mm.

Furthermore, the connecting terminal 30 shown in FIGS. 16 to 20 is positioned on the inside of the outer cylindrical portion 32 and the nut 47 is provided on the internal surface of the end face plate portion 33. The nut 47 is provided on the inside of the outer cylindrical portion 32 in a non-rotation state. The nut 47 is inserted in the outer cylindrical portion 32 in a fitting state or is fixed to the end face plate portion 33 and is thus provided on the inside of the outer cylindrical portion 32 in the non-rotation state.

Figure 18:
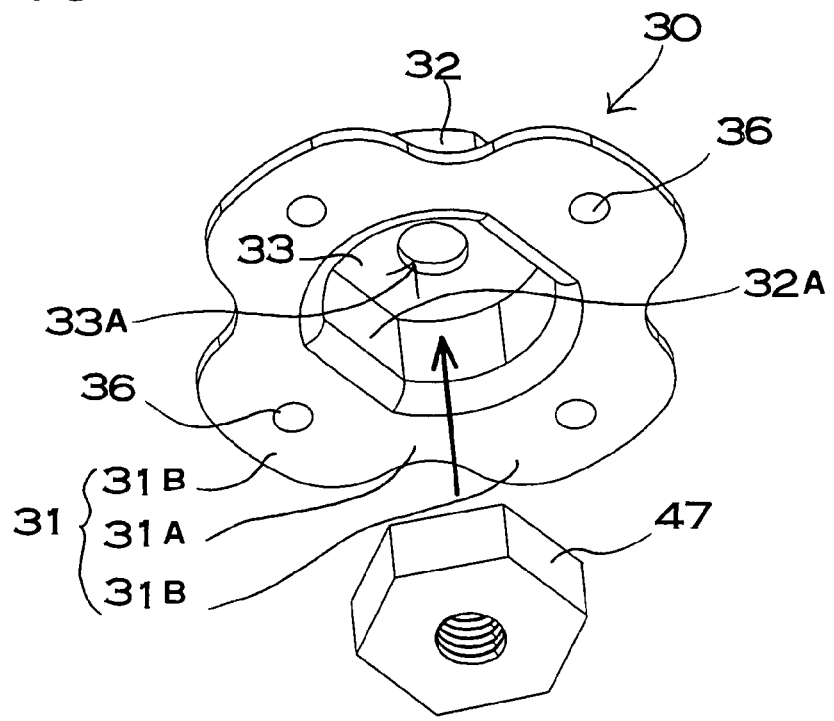
FIG. 18 is an exploded perspective view showing a connecting terminal illustrated in FIG. 16.
Figure 19:
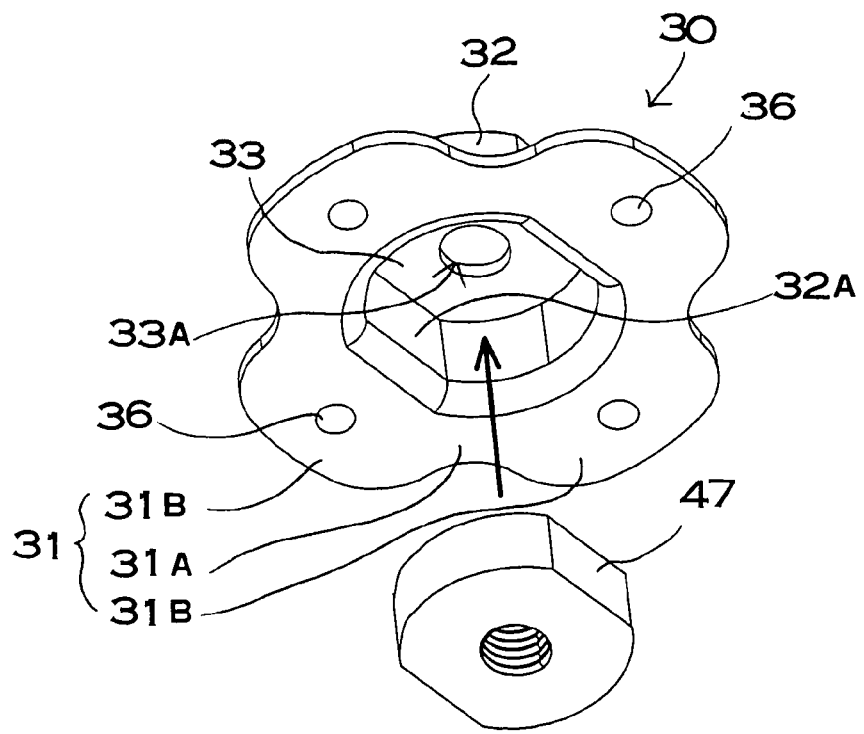
FIG. 19 is an exploded perspective view showing another example of the connecting terminal.

The nut 47 to be inserted in the outer cylindrical portion 32 in a fitting state can be provided in such a state that an outer peripheral surface is caused to come in plane contact with the plane 32A of the outer cylindrical portion 32 and can be brought into a non-rotation state as shown in FIG. 18, for example. Furthermore, the nut 47 can also take an external shape which is almost equal to the internal shape of the outer cylindrical portion 32 as shown in FIG. 19. These structures have a feature that the nut 47 can be positioned and inserted in the internal surface of the outer cylindrical portion 32 and can be thus disposed in an accurate position of the end face plate portion 33. Furthermore, the nut 47 can also have a size of an external shape set to be almost equal to or slightly larger than a size of the internal shape of the outer cylindrical portion 32 and can be thus pressed and fixed to the inside of the outer cylindrical portion 32. As described above, the nut 47 to be inserted in the outer cylindrical portion 32 in the non-rotation state does not need to be fixed to the end face plate portion 33. The reason is that the setscrew 45 can be screwed into the nut 47 to interpose the bus bar 40 and the end face plate portion 33 by a screw head of the setscrew 45 and the nut 47, and connecting the connecting terminal 30 to the bus bar 40. The nut to be inserted into the outer cylindrical portion in the non-rotation state can also be fixed to the end face plate portion.

Figure 20:
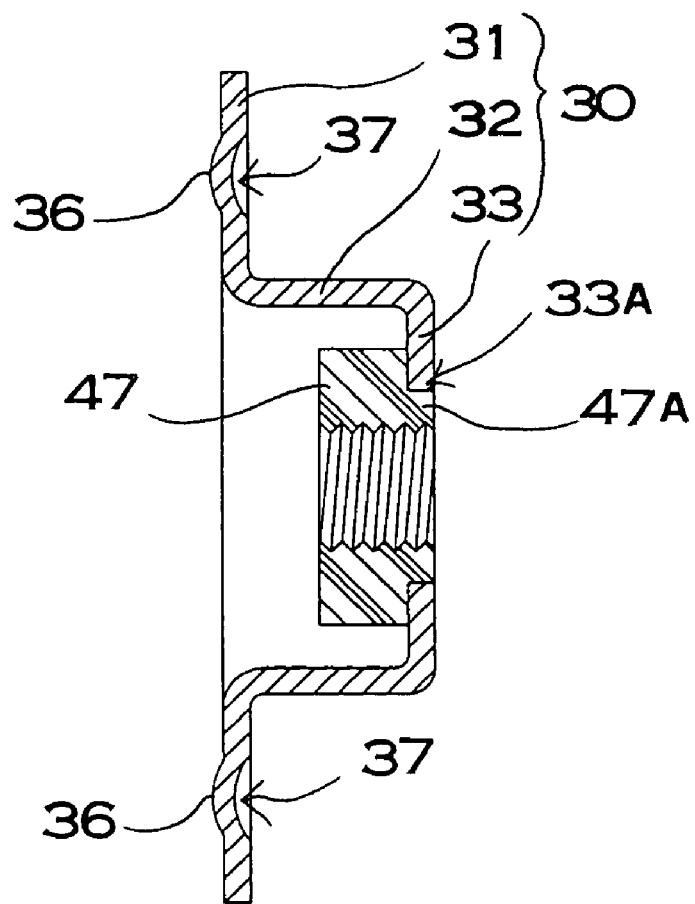
FIG. 20 is a sectional view showing the another example of the connecting terminal.

The nut 47 to be fixed to the end face plate portion 33 is fixed by welding, bonding or pressure bonding, for example. The nut 47 is fixed to the end face plate portion 33 in such a posture that the female screw hole provided on a center is opposed to the through hole 33A of the end face plate portion 33. The nut 47 can be welded to the end face plate portion 33 by resistance spot welding, for example. With this structure, the nut 47 can be fixed to the end face plate portion 33 very easily. Furthermore, FIG. 20 shows a state in which the nut 47 is set to be a press nut to be pressure bonded to the end face plate portion 33. The nut 47 has a press-in protruded portion 47A protruded in an axial direction provided in a central part of one of end faces. The press-in protruded portion 47A has an outer peripheral surface processed to be rollet-shaped or inversely tapered. The press-in protruded portion 47A of the nut 47 is pressed into the through hole 33A formed on the end face plate portion 33 by pressing and is deformed to be a part of the end face plate portion 33 or is throttled and is thus fixed to the end face plate portion 33. As described above, the structure in which the nut 47 is fixed to the end face plate portion 33 has a feature that the nut 47 can be effectively prevented from slipping from the outer cylindrical portion 32 in a manufacturing process.

In the first electrode of the cell 21, the convex electrode 22 is protruded from the surface of the sealing plate 23 as shown in FIGS. 10 and 16. In the connecting terminal 30 to be fixed to the first electrode, the convex electrode 22 is disposed in the outer cylindrical portion 32. Accordingly, the connecting terminal 30 has such a shape that the internal shape of the outer cylindrical portion 32 is set to be larger than the external shape of the convex electrode 22 and the convex electrode 22 can be thus disposed on the inside of the outer cylindrical portion 32. Furthermore, the connecting terminal 30 is set to have such a length that the internal cylindrical portion 34 does not abut on the convex electrode 22 in a state in which the fixing plate portion 31 is fixed to the sealing plate 23. In other words, the connecting terminal 30 has such a shape that the fixing plate portion 31 can be fixed to the surface of the sealing plate 23 without causing the tip of the inner cylindrical portion 34 to come in contact with the convex electrode 22. In the connecting terminal 30 in which the nut 47 is provided in the outer cylindrical portion 32, furthermore, there is set such a length that the nut 47 does not abut on the convex electrode 22 and the end face plate portion 33 at the same time in a state in which the fixing plate portion 31 is fixed to the sealing plate 23. In other words, a distance between the tip of the convex electrode 22 and the internal surface of the end face plate portion 33 is set to be greater than the thickness of the nut 47.

The connecting terminal 30 having the structure described above is fixed to the first electrode and the second electrode in the battery module 20. In the first electrode, the connecting terminal 30 is fixed to the sealing plate 23 so as not to come in contact with the caulking convex portion 24. In the battery module 20 shown in the drawing, an insulating cap 50 is attached to an end on the first electrode side in order to prevent the connecting terminal 30 to be fixed to the first electrode from coming in contact with the caulking convex portion 24.

The insulating cap 50 is fabricated by molding an insulating material such as plastic or synthetic rubber to be ring-shaped. In the cell 21, the sealing plate 23 is set to be the first electrode and the outer can 25 is set to be the second electrode. When the connecting terminal 30 to be fixed to the sealing plate 23 comes in contact with the caulking convex portion 24 to be a part of the outer can 25, consequently, it is short-circuited. In order to insulate the connecting terminal 30 from the caulking convex portion 24, the insulating cap 50 is disposed between the connecting terminal 30 to be fixed to the sealing plate 23 and the caulking convex portion 24, and carrying out the insulation. The insulating cap 50 shown in FIG. 10 includes an insulating ring portion 52 for covering and insulating the surface of the caulking convex portion 24, and a cylindrical portion 51 which is molded to be coupled to the outer periphery of the insulating ring portion 52. In the insulating cap 50 formed of plastic, a whole body constituted by the cylindrical portion 51 and the insulating ring portion 52 can be molded integrally. For this reason, it is not necessary to separately fabricate and couple the insulating ring portion 52 and the cylindrical portion 51. The insulating portion 50 is provided with a through hole 53 in order to weld the connecting terminal 30 to the first electrode. The through hole 53 is formed on the insulating ring portion 52. In the insulating cap 50 in FIG. 10, furthermore, a ring convex portion 54 for covering the internal surface of the caulking convex portion 24 is molded integrally with the inner peripheral edge of the insulating ring portion 52 and is thus provided. The ring convex portion 54 takes such a shape as to be fitted in the caulking convex portion 24. The insulating cap 50 is disposed in a constant position with the ring convex portion 54 fitted in the caulking convex portion 24, and insulating the connecting terminal 30 to the caulking convex portion 24.

The battery module 20 having both ends to which the connecting terminal 30 is fixed is put in the holding portion 13 of the case 10 and is arranged in a constant position in a parallel posture as shown in FIGS. 5 and 6. In this state, the outer cylindrical portion 32 of the connecting terminal 30 penetrates through the peripheral wall 16 of the case 10. Accordingly, the peripheral wall 16 of the case 10 is provided with a fitting portion 17 for guiding the outer cylindrical portion 32 of the connecting terminal 30. In the case 10 shown in the drawing, an almost semicircular concave portion for fitting the outer cylindrical portion 32 on the peripheral wall 16 of the upper case 11 and the lower case 12 is provided to be the fitting portion 17. Furthermore, the fitting portion 17 takes such a shape that internal surfaces on both sides are planes and a plane 32A provided on an opposed outer periphery of the outer cylindrical portion 32 in the connecting terminal 30 can be fitted as shown in FIG. 5. The fitting portion 17 taking such a shape can support the outer cylindrical portion 32 of the connecting terminal 30 in a predetermined posture so as not to rotate the outer cylindrical portion 32. In the case 10, the battery module 20 is first put in the lower case 12, and the upper case 11 is coupled to the lower case 12.

In the state described above, the bus bar 40 is fixed with the setscrew 45 to the connecting terminal 30 exposed outward from the peripheral wall 16 of the case 10. The bus bar 40 is fixed in a contact state with the end face plate portion 33 of the connecting terminal 30. The setscrew 45 penetrates through the bus bar 40 and is screwed into the female screw 34A of the inner cylindrical portion 34 in the connecting terminal 30, and is thus fixed to the connecting terminal 30. The bus bar 40 is a metal plate and is provided with the through hole 41 for causing the outer cylindrical portion 32 to penetrate.

In the connecting terminal 30 shown in FIGS. 21 to 24, furthermore, the screw cylindrical portion 35 is provided in the fixing plate portion 31. The connecting terminal 30 is also fabricated by pressing the metal plate. In the fixing plate portion 31 to be fixed to the first electrode, a center concave portion 38 for guiding the convex electrode 22 is provided in a central part of an opposed surface to the sealing plate 23 as shown in FIG. 21. In the fixing plate portion 31, a portion provided with the center concave portion 38 is protruded outward and serves as a center convex portion 39. The bus bar 40 is fixed to the surface of the center convex portion 39. When the bus bar 40 to be fixed to the center convex portion 39 comes in contact with the caulking convex portion 24, it is short-circuited. Accordingly, the center convex portion 39 is protruded to have such a height that the bus bar 40 to be fixed to the center convex portion 39 does not come in contact with the caulking convex portion 24. Furthermore, the connecting terminal 30 to be fixed to the first electrode is set to take an external shape which is smaller than the internal shape of the caulking convex portion 24, and is fixed to the sealing plate 23 in a state in which it does not come in contact with the caulking convex portion 24.

Figure 12:
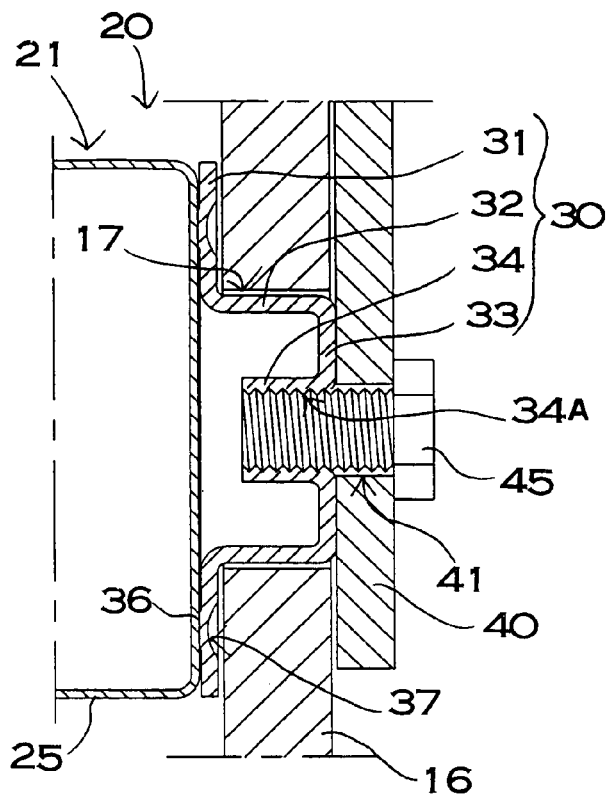
FIG. 12 is a sectional view showing a coupling structure of a second electrode of the battery module.
Figure 13:
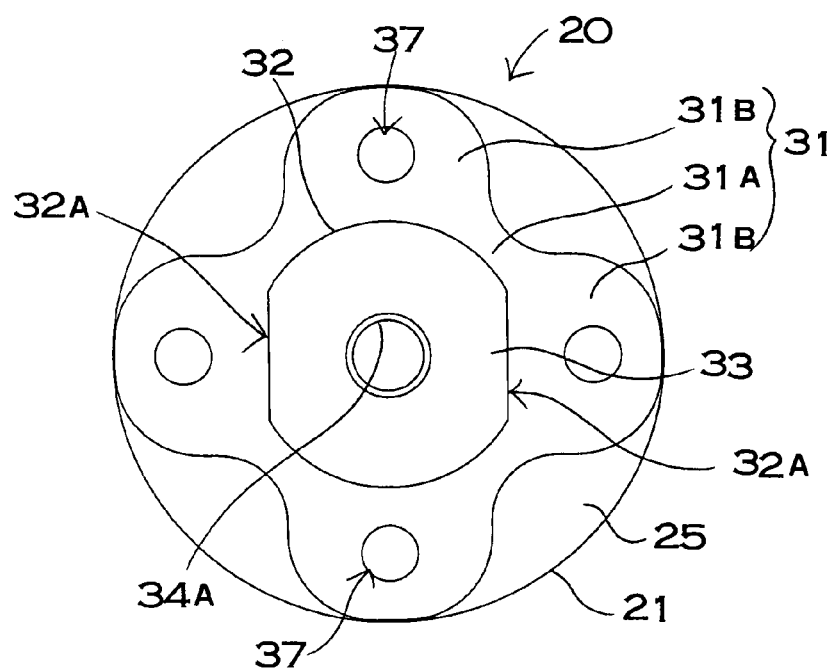
FIG. 13 is a front view showing a state in which the connecting terminal is fixed to the second electrode of the battery module.
Figure 14:
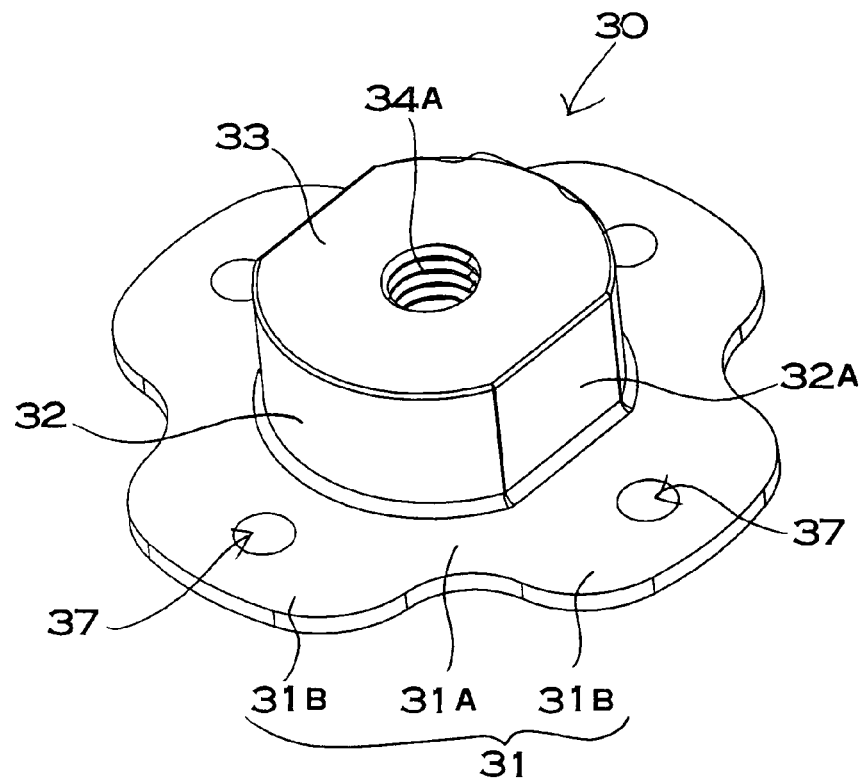
FIG. 14 is a perspective view showing the connecting terminal to be connected to the second electrode of the battery module.
Figure 15:
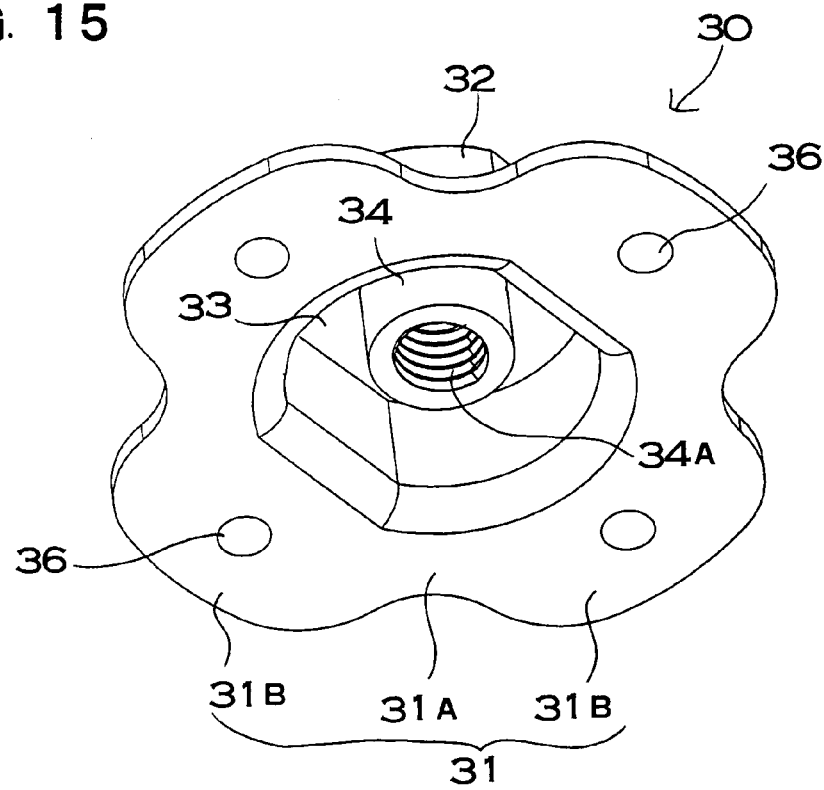
FIG. 15 is a perspective view showing a bottom face of the connecting terminal illustrated in FIG. 14.

The fixing plate portion 31 to be fixed to the second electrode is fixed to the bottom face of the outer can 25 having no convex electrode. Differently from the connecting terminal 30 to be fixed to the first electrode, accordingly, it is not necessary to always provide the center convex portion 39. It is also possible to provide the center convex portion. In the connecting terminal 30 to be fixed to the second electrode, the bus bar 40 is fixed in abutment on the outside surface of the fixing plate portion 31 taking a planar shape. In the connecting terminal 30 having the center convex portion 39, the bus bar 40 is fixed in abutment on the surface of the center convex portion 39. In a connecting terminal having a center convex portion which is not shown, furthermore, it is also possible to increase the amount of protrusion of the center convex portion, and causing the center convex portion to penetrate through the peripheral wall of the case as shown in FIGS. 10 and 12.

The screw cylinder portion 35 is provided with the male screw 35A on the outside surface. The screw cylinder portion 35 penetrates through the bus bar 40. The nut 46 is screwed into the screw cylinder portion 35 protruded from the bus bar 40 so that the bus bar 40 is fixed to the connecting terminal 30. The screw cylinder portion 35 has such a length that it can penetrate through the bus bar 40, and furthermore, the nut 46 can be screwed and fixed firmly into a portion protruded from the bus bar 40. A height, that is, a length of the protrusion of the screw cylinder portion 35 from the fixing plate portion 31 is equal to or greater than a sum of the thicknesses of the bus bar 40 and the nut 46. The screw cylinder portion 35 can firmly screw the nut 46.

Figure 23:
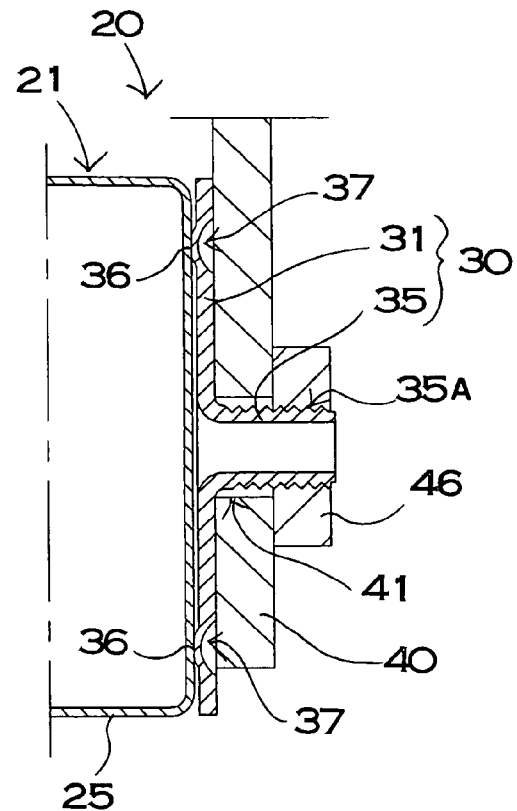
FIG. 23 is a sectional view showing a coupling structure of a second electrode of the battery module in the power device according to the further example of the present invention.
Figure 24:
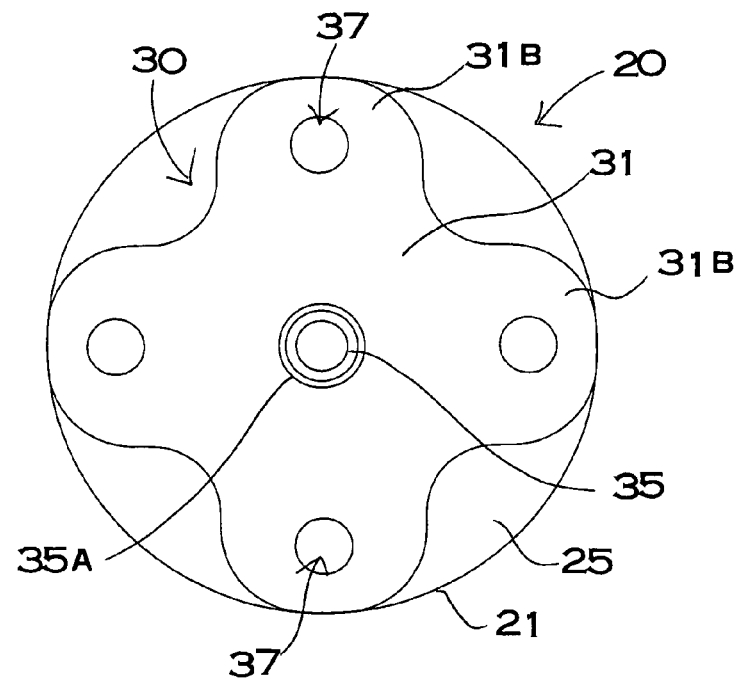
FIG. 24 is a front view showing a state in which the connecting terminal is fixed to the second electrode of the battery module illustrated in FIG. 23.

The connecting terminal 30 having the structure described above is fixed to the first electrode and the second electrode in the battery module 20. Referring to the first electrode, the connecting terminal 30 having the center concave portion 38 which does not come in contact with the caulking convex portion 24 is fixed to the sealing plate 23 so as not to come in contact with the caulking convex portion 24. In the battery module 20 shown in FIGS. 21 and 22, the insulating cap 50 is attached to the end on the first electrode side in order to prevent the connecting terminal 30 to be fixed to the first electrode from coming in contact with the caulking convex portion 24. The insulating cap described above can be used for the insulating cap 50. The connecting terminal 30 having no center convex portion is fixed to the second electrode. The battery module 20 having both ends to which the connecting terminal 30 is fixed is input in the holding portion of the case and is arranged in a constant position in a parallel posture, which is not shown. In this state, the bus bar 40 is fixed to the connecting terminal 30 with the nut 46 as shown in FIGS. 21 and 23. The bus bar 40 inserts the screw cylinder portion 35 in the through hole 41 and the nut 46 is screwed into the portion protruded from the bus bar 40 so that the bus bar 40 is fixed to the connecting terminal 30. The bus bar 40 is attached to the fixing plate portion 31 and the nut 46 and is thus fixed to the connecting terminal 30.

As this invention may be embodied in several forms without departing from the spirit or essential characteristics thereof, the present embodiment is therefore illustrate and not restrictive, since the scope of the invention is defined by the appended claims rather than by the description preceding them, and all changes that fall within the metes and bounds of the claims, or equivalence of such metes and bounds thereof are therefore intended to be embraced by the claims. This application is based on Application No. 2004-335131 filed in Japan on Nov. 18, 2004, the content of which is incorporated hereinto by reference.

What is claimed is:

1. A power device comprising:
   a plurality of cells, each having an end;
   a battery module for coupling the plurality of cells rectilinearly and fixing a connecting terminal to the end of at least one of the plurality of cells;
   a bus bar connected to the connecting terminal of the battery module, and a setscrew penetrating through the bus bar, wherein the connecting terminal includes:
      a fixing plate portion welded and fixed to the end of the at least one of the plurality of cells;
      an outer cylindrical portion protruding in an axial direction of the end of the at least one of the plurality of cells from the fixing plate portion, the outer cylindrical portion having a tip surface, and the outer cylindrical portion being substantially cylindrical in shape;
      an end face plate portion closing the tip surface of the outer Cylindrical portion; and
      an inner cylindrical portion provided in a central part of the end face plate portion, positioned on an inside of the outer cylindrical portion and protruding from the end face plate portion toward the fixing plate portion, the inner cylindrical portion having an internal surface and a female screw on the internal surface, and the inner cylindrical portion being provided concentrically with the outer cylindrical portion,
   wherein the setscrew engages the female screw such that the bus bar is fixed to the connecting terminal,
   wherein the connecting terminal is made off a metal plate integrally forming the inner cylindrical portion and the outer cylindrical portion, and
   wherein a length of the female screw on the internal surface of the inner cylindrical portion is equal to or greater than three times the thickness of the metal plate.

2. The power device according to claim 1,
   wherein the at least one of the plurality of cells having an electrode end face or an outer peripheral surface at the end forming a contact surface, and
   wherein the fixing plate portion of the connecting terminal is welded and fixed to the contact surface of the at least one of the plurality of cells.

3. The power device according to claim 2, wherein the fixing plate portion of the connecting terminal having a concave portion on an opposite surface to the contact surface of the at least one of the plurality of cells, the fixing plate portion having a welded portion to the at least one of the plurality of cells thinned by the concave portion.

4. The power device according to claim 2, wherein the fixing plate portion of the connecting terminal has a convex portion protruding toward the contact surface of the at least one of the plurality of cells and a concave portion is provided on an opposite surface to the convex portion, the fixing plate portion having a welded portion to the at least one of the plurality of cells thinned by the concave portion and the convex portion.

5. The power device according to claim 1, wherein the outer cylindrical portion of the connecting terminal takes a cylindrical shape and a plane is provided on a part of an outer peripheral surface opposed to the outer cylindrical portion.

6. The power device according to claim 1, wherein the connecting terminal sets a length of the inner cylindrical portion to be greater than a half of a length of the outer cylindrical portion, the inner cylindrical portion having a nadir relative to the end face plate portion such that there is a clearance between the nadir and the end of at least one of the plurality of cells.

7. The power device according to claim 1,
   wherein the battery module arranging at least two of the plurality of cells in parallel, the battery module being accommodated in a case,
   wherein the case has a holding portion for holding the battery module and has a peripheral wall defining a fitting portion for inserting and guiding the outer cylindrical portion of the connecting terminal fixed to the end of at least one of the plurality of cells, and
   wherein the bus bar is fixed to the connecting terminal with the setscrew such that the outer cylindrical portion of the connecting terminal fixed to the end of at least one of the plurality of cells is inserted through the peripheral wall, and the peripheral wall being disposed between the bus bar and the end of at least one of the plurality of cells.

8. The power device according to claim 7, wherein the outer cylindrical portion has such a height that the end face plate portion is positioned on a substantially same level with or slightly protruding outward from an outside surface of the peripheral wall.

* * * * *